US007603787B1

(12) United States Patent
Butler, III

(10) Patent No.: US 7,603,787 B1
(45) Date of Patent: Oct. 20, 2009

(54) MAIL MEASUREMENT APPARATUS AND METHOD

(76) Inventor: John B. Butler, III, 1217 Anthony Ave., Columbia, SC (US) 29201

(*) Notice: Subject to any disclaimer, the term of this patent is extended or adjusted under 35 U.S.C. 154(b) by 8 days.

(21) Appl. No.: 11/774,249

(22) Filed: Jul. 6, 2007

Related U.S. Application Data

(60) Provisional application No. 60/916,486, filed on May 7, 2007.

(51) Int. Cl.
*G01B 3/50* (2006.01)
*G01B 3/14* (2006.01)
*B07C 1/14* (2006.01)

(52) U.S. Cl. ......................... 33/501.45; 33/562; 33/563

(58) Field of Classification Search ................... 33/1 V, 33/1 BB, 501, 501.45, 541, 613, 623, 645, 33/562, 563, 565, 566; 705/401, 406, 407
See application file for complete search history.

(56) References Cited

U.S. PATENT DOCUMENTS 387,284 A * 8/1888 Dupee ......................... 33/562
2,048,090 A * 7/1936 Zieger .......................... 33/563
2,389,842 A * 11/1945 Cummins .................... 33/833
3,318,006 A * 5/1967 Martinez ..................... 33/562
4,607,433 A * 8/1986 Meeker ..................... 33/1 BB
5,031,332 A * 7/1991 Newman ..................... 33/562
5,152,122 A * 10/1992 DeBarber et al. ............. 53/460
5,584,125 A * 12/1996 Prete ....................... 33/501.45
5,727,692 A 3/1998 Large et al.
2007/0288402 A1* 12/2007 Collings ..................... 705/407
2008/0301065 A1* 12/2008 Fajour ........................ 705/410
2008/0301964 A1* 12/2008 Jordan et al. .................. 33/562

FOREIGN PATENT DOCUMENTS

CA 2246706 A1 * 3/2000
DE 9305197 U1 * 8/1993
DE 9307878 U1 * 10/1993
DE 4328579 A1 * 3/1995

* cited by examiner

*Primary Examiner*—G. Bradley Bennett
*Assistant Examiner*—Amy Cohen Johnson
(74) *Attorney, Agent, or Firm*—Nelson Mullins Riley & Scarborough, LLP

(57) ABSTRACT

A mail measurement apparatus in the form of a generally rectangular prism having four sides and front and back surfaces. At least one of the sides includes an indentation with a specific depth and a specific breadth. When the side is placed against a flat surface, the indentation creates a gap between the apparatus and the surface. The depth of the gap corresponds to a maximum allowed thickness for a class of mail, while the breadth of the gap corresponds with either the maximum allowed width of length associated with the same class of mail. The other sides of the apparatus may include additional indentations of varying sizes which may correspond to other predetermined maximum dimensions allowed by a postal carrier for the same or other classes of mail.

16 Claims, 6 Drawing Sheets

MAIL MEASUREMENT APPARATUS AND METHOD

CLAIM OF PRIORITY

The present application claims the benefit of the United States provisional application filed on May 7, 2007 by John B. Butler for "Mailslotter" (Ser. No. 60/916,486), the entire disclosure of which is incorporated herein by reference.

FIELD OF THE INVENTION

The present invention relates generally to the measurement of mail. More particularly, the present invention relates to an apparatus used to determine if a specific piece of mail complies with the dimensional requirements established by a postal carrier.

BACKGROUND OF THE INVENTION

Envelopes, parcels, and other packages containing items may be shipped using postal carriers. In the past, most carriers calculated the fee to charge for the transportation of certain items, such as letters and envelopes, on the weight of the item and its container, as well as the distance the item was to be transported. Accordingly, the fee charged for the transportation of a letter or envelope would generally be based solely on the distance to be traveled and the weight of the item, regardless of the envelope's size.

Previous systems were designed to assist customers in estimating the costs associated with transporting the item simply by weighing the item. Other systems allow a customer to estimate the total costs of transportation based on the item's weight along with the originating and destination postal or zip codes.

Some carriers have begun to include size or dimensional requirements as a factor in the calculation of the transportation fees for items previously calculated solely on weight. These and other carriers may require that the dimensions of a letter or envelope fall within a specific range in order to qualify for certain rates that correspond with that range. If the length, width, and/or thickness of an envelope exceeds the maximum allowable length, width, or thickness for a class of mail, the fee required to transport the letter will increase to the rate associated with the class of mail corresponding to the dimensional range in which the letter will be categorized. In some cases, if the dimensions of a letter or envelope exceed the maximum allowable dimensions for letters, the item may be reclassified as a package for which the associated transportation fee will be greater.

In other situations, a letter may fail to qualify for a less expensive class due to the manner in which it has been folded. Folding the letter in a different manner, however, may allow it to qualify for the less expensive class. For instance, if a postal carrier has established a maximum thickness for a class of mail, folding a multi-page letter several times may cause the thickness of the enclosing envelope to exceed the maximum allowable thickness for that class. Instead, folding the letter in halves or not at all and placing the letter in a wider and/or longer envelope may allow the letter to qualify for the less expensive class. Prior measurement devices, however, do not allow the user to determine that different arrangements would be more cost-effective.

SUMMARY OF THE INVENTION

The present invention recognizes and addresses the foregoing considerations, and others, of prior art construction and methods. In this regard, one aspect of the invention provides a mail measurement apparatus comprising a generally flat rectangular prism having a number of sides, a front surface, and a back surface, wherein one side defines an indentation having a depth and a breadth. The depth and the breadth correspond to a set of maximum dimensional requirements established by a postal carrier for a class of mail.

According to another aspect, the present invention also provides a mail measurement apparatus comprising a generally rectangular prism having a bottom surface, a top surface, a front surface, a back surface, and two side surfaces. At least a portion of the top surface is open. The generally rectangular prism defines a volume having a width, length, and height. The width, length, and height correspond to a set of maximum dimensional requirements established by a postal carrier for a class of mail.

A further aspect of the present invention provides a method for determining compliance with a set of maximum dimensional requirements established by a postal carrier by placing a side of a generally flat rectangular prism mail measurement apparatus against a flat substrate. The first surface defines a first indentation, which, along with the flat surface, defines a gap having a height and a width. The dimensions of the gap correspond to the dimensional requirements established by a postal carrier for a specific class of mail. Another step of the method is sliding a piece of mail widthwise through the gap to determine compliance with the dimensional requirements.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1A:
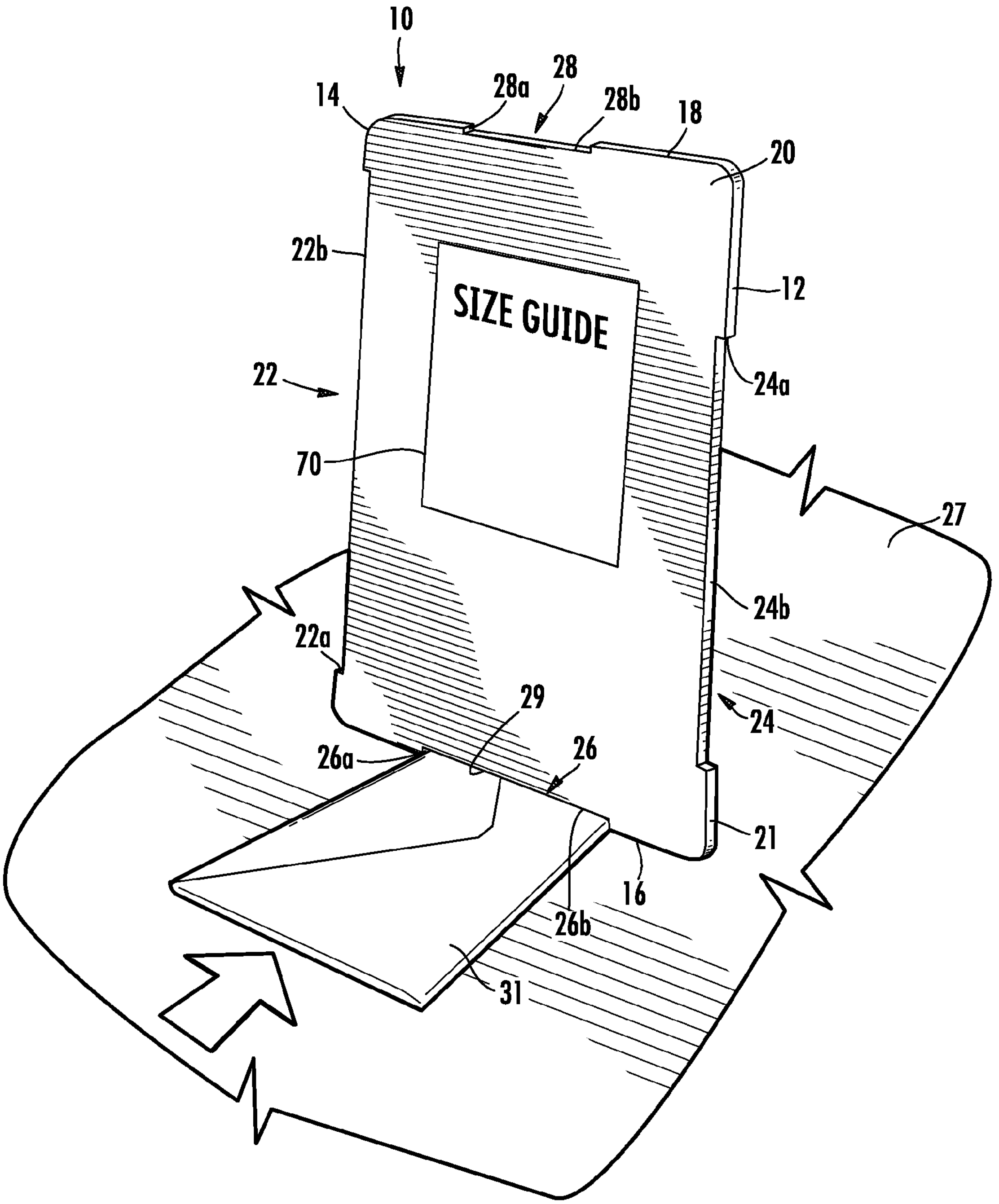
FIG. 1A is a perspective view of a mail measurement apparatus in accordance with an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 1B:
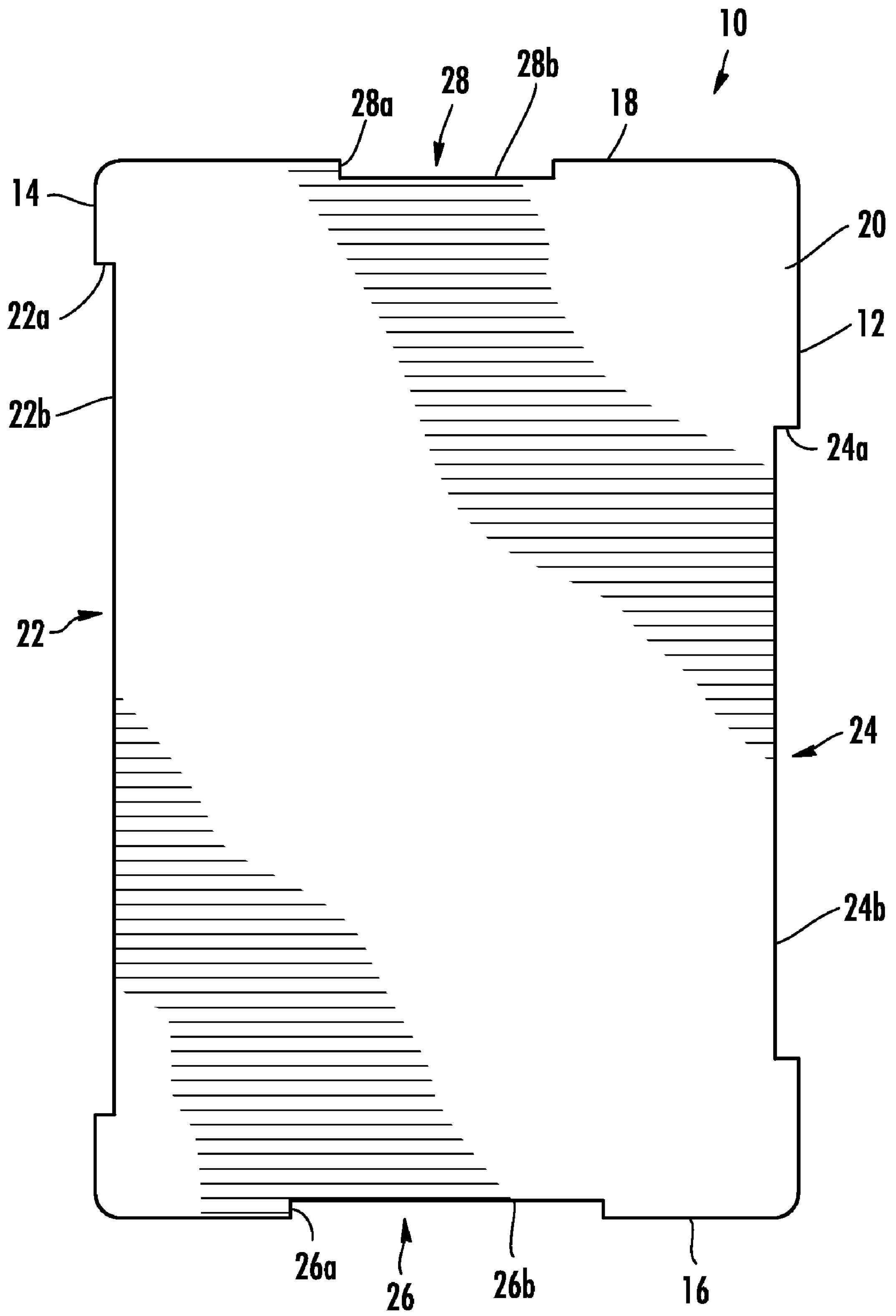
FIG. 1B is a front elevation view of the mail measurement apparatus shown in FIG. 1A.
Figure 1C:
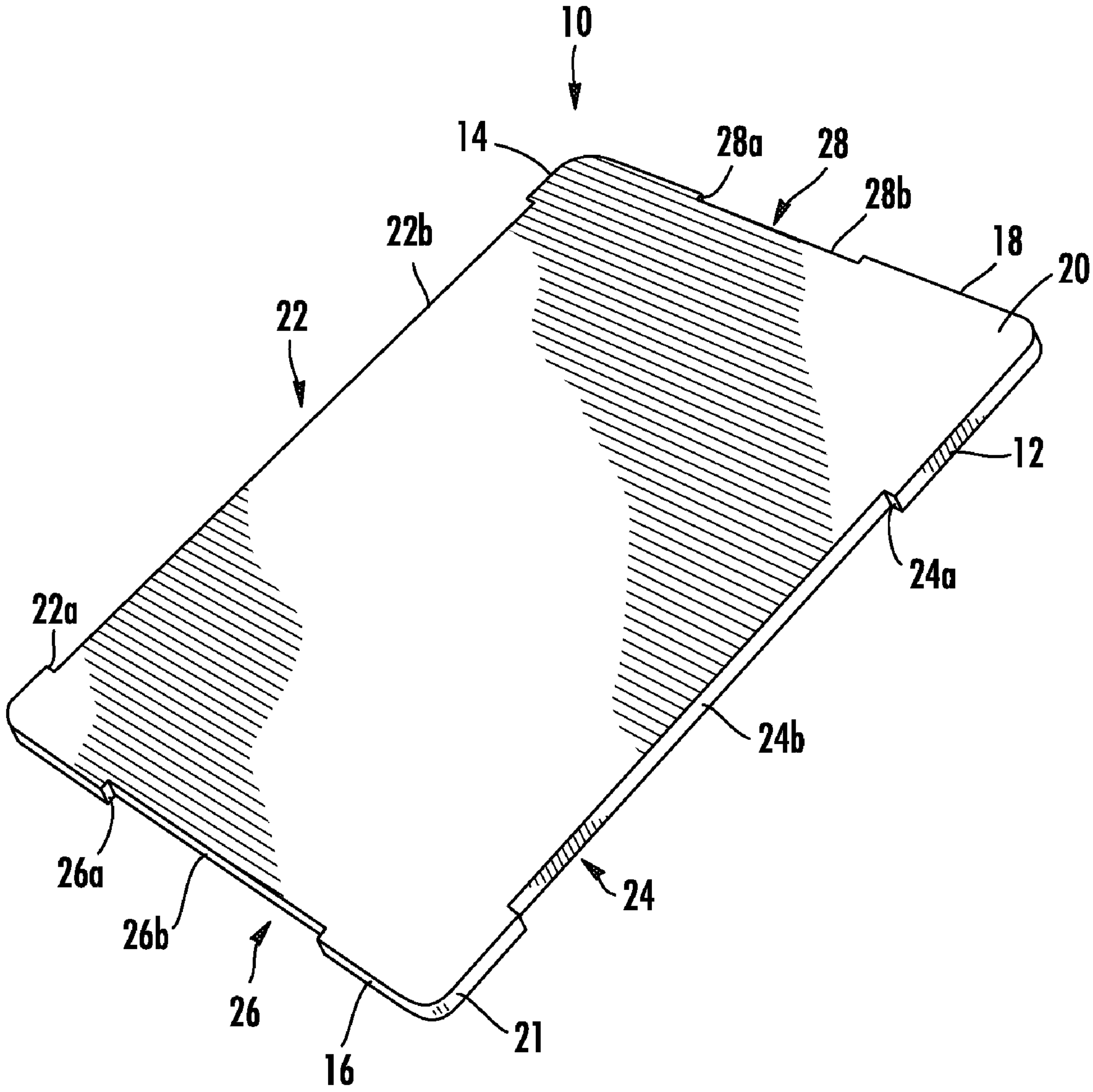
FIG. 1C is a perspective view of the mail measurement apparatus shown in FIG. 1A.

FIGS. 1A, 1B, and 1C illustrate a mail measurement apparatus 10 constructed in accordance with another embodiment of the present invention. In this embodiment, each side 12, 14, 16, and 18 defines respective indentations 22, 24, 26, and 28. Each indentation delineates a specific depth and breadth similar to the above description. As shown most clearly in FIG. 2B, apparatus 10 is a generally flat rectangular prism having a thickness denoted by 21. It should be understood by one of ordinary skill in the art that apparatus 10 may be constructed to exhibit various lengths, widths, and thicknesses, as well as indentations of various sizes, without departing from the scope of the present invention depending on the dimensional requirements established by the applicable postal carrier.

In operation, one of sides 12, 14, 16, or 18 is placed against a flat substrate, thereby creating a gap defined between the substrate and the respective indentation. The gaps, either alone or in combination, correspond to the maximum allowable dimensions for specific classes of mail that have been established by a postal carrier. For example, a postal carrier may require a letter to have a maximum width of a, a maximum length of b, and a maximum thickness of c in order to qualify for the class of mail associated with the least expensive rates. As shown most clearly in FIG. 1A, indentation 26 of side 16 creates a gap 29 when side 16 is placed against a flat surface, such as tabletop 27. Gap 29 has a specific depth 26*a* and a specific breadth 26*b*. In this exemplary embodiment, depth 26*a* may equate to thickness c, while breadth 26*b* may equate to length b. A piece of mail, such as letter 31, is placed on top of tabletop 27 and slid through gap 29. If letter 31 is capable of being passed through gap 29, then it satisfies at least the thickness and length requirements for that class of mail.

Width a associated with the same class of mail, however, may equate to breadth 24*b* of the gap created by indentation 24 when side 12 is placed against tabletop 27. The user then rotates apparatus 10, places side 12 against tabletop 27, rotates the letter ninety degrees, and attempts to pass it through the gap defined by indentation 24 and the tabletop. If the letter is able to pass through the gap, it also satisfied the width requirement (width a) for that specific class of mail. Accordingly, it should be understood that the depths and breadths of indentations 22, 24, 26, and 28 may apply to the width, length, and thickness of one or more different classes of mail. Additionally, the widths, lengths, and thicknesses for different classes of mail may overlap.

If the letter is unable to fit through the gaps created by indentations 24 or 26 when sides 16 or 12 are placed against the flat substrate, respectively, the user may nonetheless be able to refold or rearrange the letter to allow it to qualify for the same class of mail. If the letter is too wide or too long, the user may be able to refold the letter to fit in an envelope having an acceptable width and length. If the letter is too thick, the user may be able to lessen the letter's thickness by folding the letter fewer times and by placing the letter in an envelope having a larger width and/or length.

Specifically, a postal carrier may establish dimensional requirements that limit the thickness of mail but permit use of envelopes of varying lengths and widths. Accordingly, a letter that exceeds the maximum thickness allowed because it has been folded too many times to fit in a small envelope may be folded fewer times in order to fit in a larger envelope. As a result, while the envelope exhibits a larger surface area, it exhibits a smaller thickness and thus qualifies for the less expensive class of mail. For example, a postal carrier may establish a maximum thickness corresponding to depth 26*a* for one class of mail and a maximum thickness greater than depth 26*a* for another class of mail. If an envelope is thinner than depth 26*a*, it falls within the less expensive class, but if it is thicker than depth 26*a*, it falls within the more expensive class. The maximum length and width for the two classes both correspond to breadth 22*a*. Accordingly, envelopes that exhibit a length and width corresponding to breadth 26*b* and 24*b* respectively (referred to as a "small envelope" for simplicity) would qualify for both classes depending on the thickness of the letter contained in the envelope. Likewise, envelopes exhibiting a length and width corresponding to breadth 26*b* and 22*b* (referred to as a "large envelope" for simplicity) would also qualify for both classes of mail depending on its thickness. A multi-page letter placed in a small envelope would need to be folded a greater number of times than would be needed if the same letter is placed in a large envelope. As such, when placed in the small envelope, the letter may not be able to pass through the gap created by indentation 26 when side 16 is placed against a flat substrate. Thus, the letter would not qualify for the less expensive class of mail. Removing the letter from the small envelope and placing it in the large envelope, however, will require that the letter be folded fewer times. As a result, the large envelope is thinner than the small envelope and able to pass through the gaps created by indentations 24 or 22 when sides 12 or 14, respectively, are placed against a flat substrate. Consequently, this allows the large envelope to qualify for the less expensive class in a situation where the small envelope would not. Apparatus 10 allows users, who would not intuitively recognize that refolding a letter to fit in a larger envelope would produce a more economical result, to reduce the amount spent on the transportation costs of letters and other mail.

Figure 2:
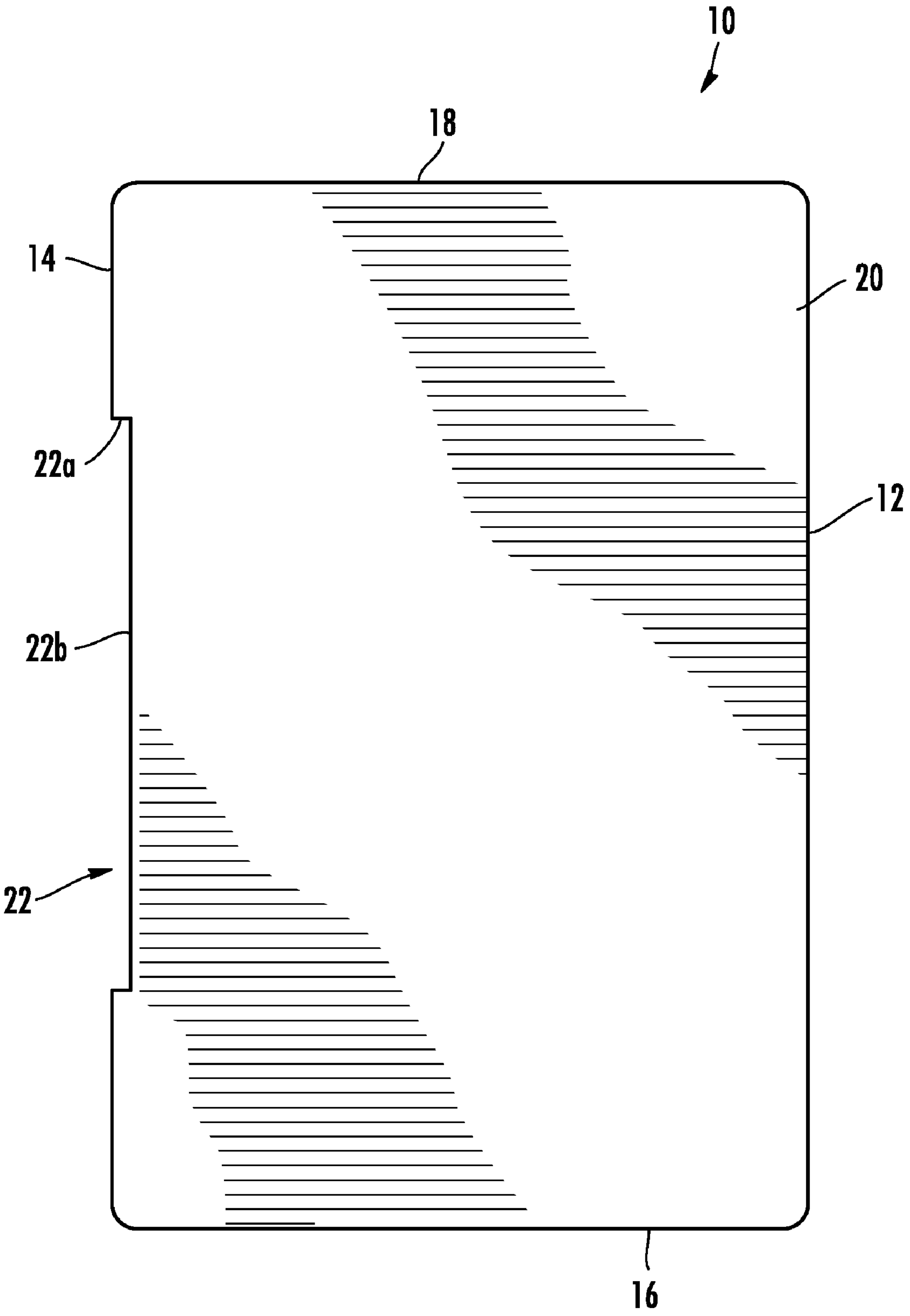
FIG. 2 is a front elevation view of a mail measurement apparatus in accordance with an embodiment of the present invention.

FIG. 2 illustrates a mail measurement apparatus 10 constructed in accordance with another embodiment of the present invention. In this exemplary embodiment, apparatus 10 is generally rectangular having long sides 12 and 14 and short sides 16 and 18. Apparatus 10 also has a front side 20 and an opposite back side. Sides 12, 14, 16, and 18 are generally straight except where long side 14 defines an indentation 22, which has a specific depth 22*a* and a specific breadth 22*b*.

In operation, long side 14 is placed against a flat substrate, such as a tabletop, so that indentation 22 defines a gap between apparatus 10 and the flat surface. Depth 22*a* defines a thickness of the gap, while breadth 22*b* defines the length of the gap. The gap's thickness and length correspond to the thickness and length of the maximum allowable requirements for a specific class of mail established by a postal carrier. The user attempts to slide an envelope through the gap defined by indentation 22 and the substrate. The letter will be unable to pass through the gap if it is either too long or too thick. As a result, the letter will not be cataloged in the class of mail to which the dimensions of the gap correspond, but will instead be associated with a more expensive class of mail. Apparatus 10 may be constructed out of plastic, such as polyurethane, wood, metal, or any other sufficiently rigid material capable of creating a gap that corresponds to specific dimensions when the apparatus is placed against a flat substrate.

Figure 3:
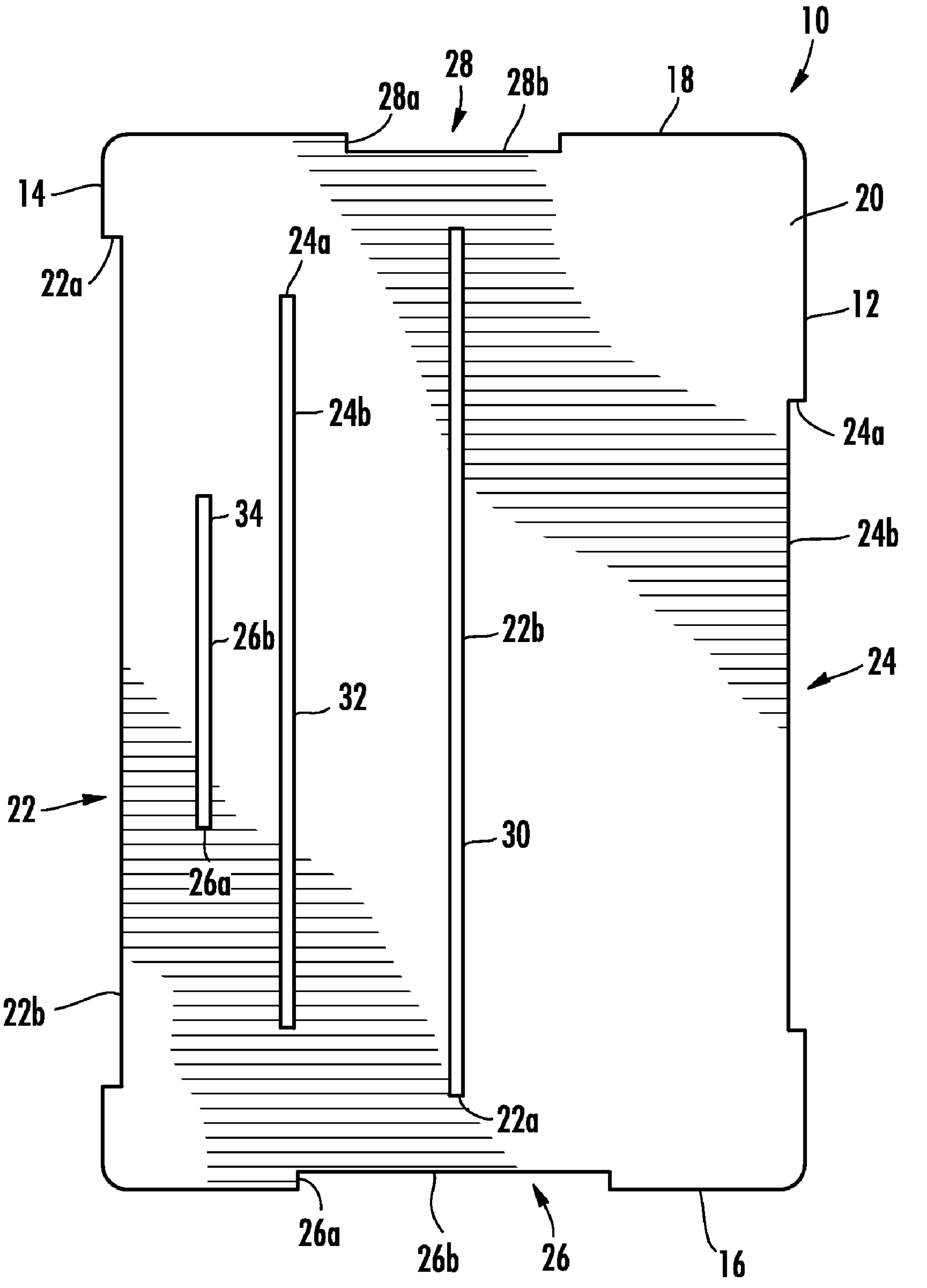
FIG. 3 is a front elevation view of a mail measurement apparatus in accordance with an embodiment of the present invention.

FIG. 3 illustrates a mail measurement apparatus 10 constructed in accordance with another embodiment of the present invention. This embodiment is similar in construction and use to that described above with respect to FIG. 2, but with the addition of slots 30, 32, and 34. Slots 30, 32, and 34 define spaces between front surface 20 and the back surface of apparatus 10 that correspond to specific dimensions. The spaces defined by slot 30, 32, and 34 correspond to the maximum allowable dimensions of a specific class of mail established by a postal carrier. In this embodiment, the dimensions of slot 30 correspond to those of indentation 22 such that the depths (22*a*) and breadths (22*b*) of slot 30 and indentation 22 are identical. Similarly, the depth and length of slots 32 and 34 correspond to those of indentations 24 and 26, respectively. Alternatively, slots 30, 32, and 34 may define spaces of various other dimensions that are different than those defined by indentations 22, 24, 26, and 28. It should be apparent that apparatus 10 may also include additional slots of other sizes that correspond to various dimensional requirements associated with other classes of mail.

In operation, the user tries to pass a letter through the slot that equates to the dimensions of the class of mail in which the user wishes to send a corresponding letter. For example, if the maximum allowable length, width, and thickness for a class of mail equate to breadth 26*b*, breadth 24*b*, and depth 26*a*, the user tests the length and thickness of an envelope containing the letter by passing it through slot 34. The user then tests the width of the letter by rotating it and passing it through slot 32. If the envelope passes through both slots, it qualifies for the less expensive class of mail.

Similar to that described above, if the envelope is too thick to pass through slot 34, the letter may be unfolded and refolded fewer times so that it's able to fit in a larger envelope that qualifies for the same class of mail. For example, the letter may be refolded to fit within an envelope whose length and width correspond to breadth 24*b* and 22*b* respectively. As a result, the letter is able to fit through slots 30 and 32 and, thus, qualifies for the class of mail associated with less transportation costs.

Referring again to FIGS. 1, 2, and 3, the standard width of most envelopes generally corresponds to the maximum width allowed by most postal carriers. This is typically the width of legal- and letter-sized paper, i.e., eight and a half inches (8½"). It should be understood by one of ordinary skill in the art that, because most envelopes exhibit this uniform width and therefore satisfy the maximum width requirement, apparatus 10, as shown in FIG. 1, can be used to simply measure an envelope's length and thickness. In such cases, if an envelope is able to pass through the gap created by indentation 22 when side 14 is placed against a flat substrate, the envelope will be categorized within the class of mail associated with the dimensions defined by the gap. In other situations where an envelope's width is not a standard measurement, apparatus 10 as shown in FIGS. 1A-C may be used to measure the length, width, and thickness of the envelope.

Figure 4:
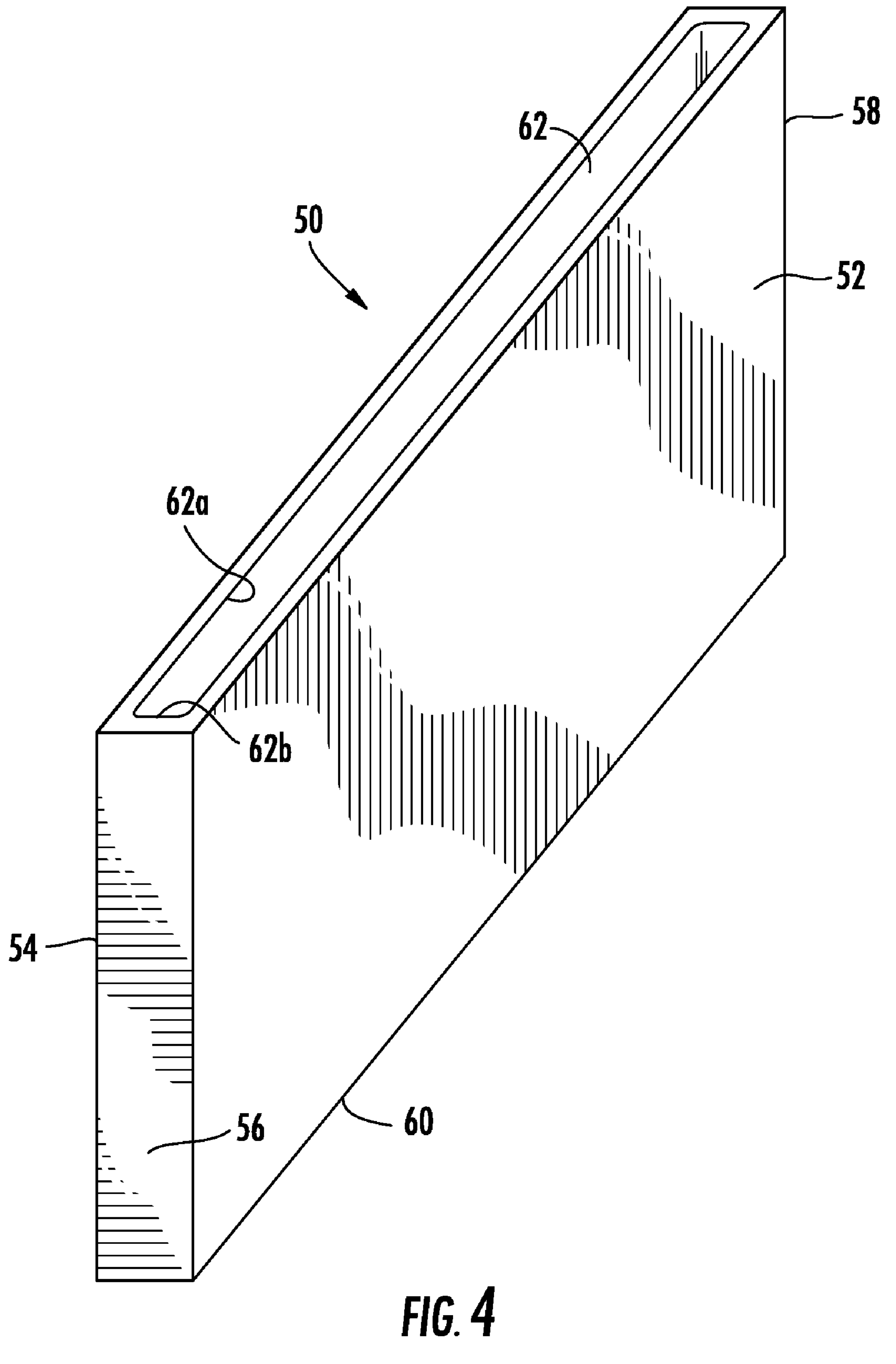
FIG. 4 is a perspective view of a mail measurement apparatus in accordance with an embodiment of the present invention.

FIG. 4 illustrates a mail measurement apparatus 50 constructed in accordance with another embodiment of the present invention. Apparatus 50 is a generally rectangular and hollow prism having a front surface 52, a back surface 54, two side surfaces 56 and 58, a base 60, and a top surface 62 defining an opening. The opening in top surface 62 exhibits a width that corresponds to the breadth 62*a* of the opening and a thickness that corresponds to the depth 62*b* of the opening.

Apparatus 50 defines an internal space within the apparatus that is delimited by specific dimensions, the width and thickness of which correspond to the breadth and depth of the opening in top surface 62 (i.e., 62*a* and 62*b*, respectively). The length of the internal space corresponds to the height of sides 56 and 58. Thus, it should be understood that the internal space defined by apparatus 50 exhibits a volume delimited by particular dimensions which correspond to the various surfaces of the apparatus.

The internal space defined by apparatus 50 corresponds to the specific width, length, and thickness maximums established by a postal carrier for a specific class of mail. It should therefore be understood by one of ordinary skill in the art that the size of apparatus 50 can easily be altered so that these dimensions and the corresponding area defined by the apparatus's internal space can be easily configured to meet any specific dimensional requirements. In fact, several similar rectangular prisms of varying dimensions can be used in combination to represent the different maximum dimensional requirements established for a class of mail.

In operation, the user attempts to place an envelope into apparatus 50 to determine whether the envelope complies with the dimensional requirements established by the postal carrier. If the envelope fails to fit within apparatus 50, the user understands that he must either rearrange the letter and/or envelope to fit within the apparatus or must be prepared to send the envelope in a different class of mail. In the scenario where a postal carrier has established several dimensional maximums for a class of mail, the user may attempt to fit the envelope in different apparatuses corresponding to these dimensions in order to determine if it complies with any one of the established dimensions.

In another embodiment, several apparatuses similar to apparatus 50 that delimit the various dimensional maximums established by a postal carrier for a class of mail may be affixed to one another. The user is then able to quickly determine if an envelope complies with any of the established requirements by attempting to fit the envelope into each apparatus. If the envelope fails to fit in any one of the apparatuses, the user understands that either the envelope will not be categorized within that specific class of mail or he must reconfigure the envelope of letter to fit within one of the apparatuses.

Referring again to FIG. 1A, another embodiment includes indicia 70 showing the rates established by a postal carrier for one or more classes of mail is affixed to a surface of the apparatuses described above. For example, the indicia may be in the form of a table which indicates the transportation fee for a letter or envelope categorized in a particular class of mail. These rates may also correspond to the maximum dimensions allowed for each class. If an envelope complies with the dimensional requirements for a class of mail (as determined by the apparatus), the user can identify the fee allocated to that class of mail. Otherwise, the user can identify the rates corresponding to other classes of mail in which the envelope will be categorized if the apparatus indicates that the envelope fails to comply with the requirements for the initially-selected class.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

I claim:

1. A mail measurement apparatus comprising:

a generally flat rectangular prism having a plurality of sides, a front surface, and a back surface, wherein a first said side defines a first indentation defined by two first indentation sides of equal length opposite one another and by a first indentation back perpendicular to and connecting said two first indentation sides wherein said two first indentation sides define a first depth and said first indentation back defines a first breadth and wherein a second said side defines a second indentation defined by two second indentation sides of equal length opposite one another and by a second indentation back perpendicular to and connecting said two second indentation sides wherein said two second indentation sides define a second depth and said second indentation back defines a second breadth, wherein said first breadth corresponds to a first predefined maximum dimension of mail, and wherein a third said side defines a third indentation having a third depth and a third breath.

2. The mail measurement apparatus of claim 1 wherein:

said third breadth corresponds to a second predefined maximum dimension of mail.

3. The mail measurement apparatus of claim 1 wherein:

a fourth said side defines a fourth indentation having a fourth depth and a fourth breadth.

4. The mail measurement of claim 3 wherein at least one indicia is affixed to said prism.

5. The mail measurement apparatus of claim 1 further comprising:

at least one slot defining at least one space extending from said front surface to said back surface in said apparatus, said slot defining a slot width and a slot height, wherein said slot width corresponds to said first predefined maximum dimension of mail and said slot height corresponds to a second predefined maximum height.

6. The mail measurement of claim 1 wherein at least one indicia is affixed to said prism.

7. The mail measurement apparatus of claim 1 wherein said second breadth corresponds to a second predefined maximum dimension of mail.

8. The mail measurement apparatus of claim 7 wherein:

said third breadth corresponds to a third predefined maximum dimension of mail.

9. A mail measurement apparatus comprising:

a generally flat rectangular prism having a plurality of sides, a front surface, and a back surface, wherein a first said side defines a first indentation defined by two first indentation sides of equal length opposite one another and by a first indentation back perpendicular to and connecting said two first indentation sides wherein said two first indentation sides define a first depth and said first indentation back defines a first breadth and wherein a second said side defines a second indentation defined by two second indentation sides of equal length opposite one another and by a second indentation back perpendicular to and connecting said two second indentation sides wherein said two second indentation sides define a second depth and said second indentation back defines a second breadth, wherein said first breadth corresponds to a first predefined maximum dimension of mail, and at least one slot defining at least one space extending from said front surface to said back surface in said apparatus, said slot defining a slot width and a slot height, wherein said slot width corresponds to said first predefined maximum dimension of mail and said slot height corresponds to a second predefined maximum height.

10. The mail measurement apparatus of claim 9 wherein said second breadth corresponds to a second predefined maximum dimension of mail.

11. The mail measurement apparatus of claim 9 wherein at least one indicia is affixed to said prism.

12. A mail measurement apparatus comprising:

a generally flat rectangular prism having a plurality of sides, a front surface, and a back surface, wherein a first said side defines a first indentation defined by two first indentation sides of equal length opposite one another and by a first indentation back perpendicular to and connecting said two first indentation sides wherein said two first indentation sides define a first depth and said first indentation back defines a first breadth and wherein a second said side defines a second indentation defined by two second indentation sides of equal length opposite one another and by a second indentation back perpendicular to and connecting said two second indentation sides wherein said two second indentation sides define a second depth and said second indentation back defines a second breadth, wherein said first breadth corresponds to a first predefined maximum dimension of mail, and a plurality of slots defining a plurality of spaces, each said space defining a space width and extending from said front surface to said back surface in said apparatus, wherein a first said space width of a first of said plurality of slots corresponds to said first predefined maximum dimension of mail and a second said space width of a second of said plurality of slots corresponds to a second predefined maximum dimension of mail.

13. The mail measurement apparatus of claim 12 wherein said second breadth corresponds to a second predefined maximum dimension of mail.

14. The mail measurement apparatus of claim 12 wherein at least one indicia is affixed to said prism.

15. A method for determining compliance with a set of maximum dimensional requirements established by a postal carrier comprising the steps of:

providing a mail measurement apparatus comprised of a flat rectangular prism, said flat rectangular prism comprising a generally planar top surface, a generally planar bottom surface, and a plurality of sides, wherein a first of the plurality of sides defines a generally u-shaped indentation wherein a left side and a right side of the indentation are perpendicular to a back side of the indentation, wherein a second of the plurality of sides defines a generally u-shaped indentation wherein a left side and a right side of the indentation are perpendicular to a back side of the indentation and, wherein a third of the plurality of sides defines a generally u-shaped indentation wherein a left side and a right side of the indentation are perpendicular to a back side of the indentation;

placing said first side against a flat substrate, wherein said first indentation and said flat substrate define a first gap having a height equal to a death of said first indentation defined by said left and right sides, having a length equal to a breadth of said first indentation defined by said back side of the indentation, and having a width equal to a thickness of said mail measurement apparatus defined by said first side, wherein said breadth corresponds to a first predefined maximum dimension of mail; and sliding a piece of mail through said first gap.

16. The method of claim 15 further comprising:

placing the second of the plurality of sides of said apparatus against a flat substrate, wherein said second indentation and said flat substrate define a second gap; and sliding said piece of mail through said second gap.

* * * * *

UNITED STATES PATENT AND TRADEMARK OFFICE

CERTIFICATE OF CORRECTION

PATENT NO. : 7,603,787 B1
APPLICATION NO. : 11/774249
DATED : October 20, 2009
INVENTOR(S) : John B. Butler, III It is certified that error appears in the above-identified patent and that said Letters Patent is hereby corrected as shown below:

Column 8, line 67, please delete "death" and replace with "depth."

Signed and Sealed this

Eighth Day of December, 2009

David J. Kappos

David J. Kappos
*Director of the United States Patent and Trademark Office*